Aug. 27, 1940.  W. J. GLADITZ  2,213,136
ELECTRIC WELDING PLIERS
Filed April 16, 1938   2 Sheets-Sheet 2
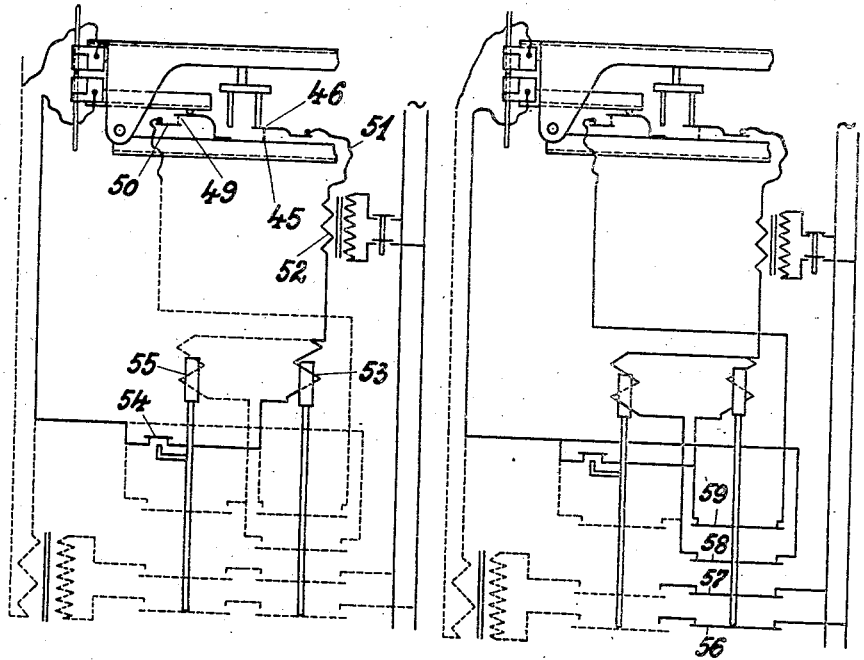
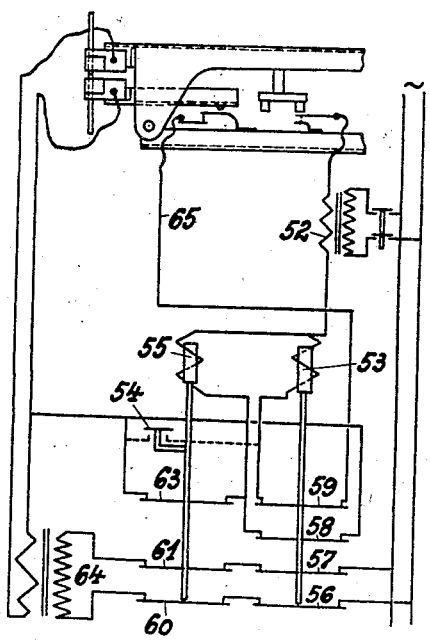
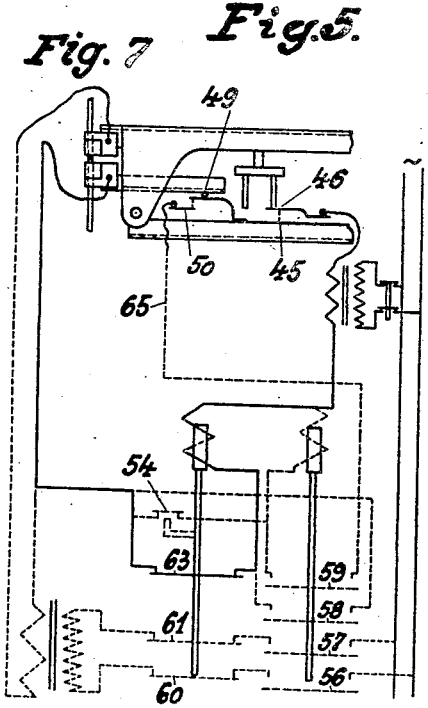
INVENTOR
WALTER J. GLADITZ
By Norris & Bateman
ATTORNEYS Patented Aug. 27, 1940

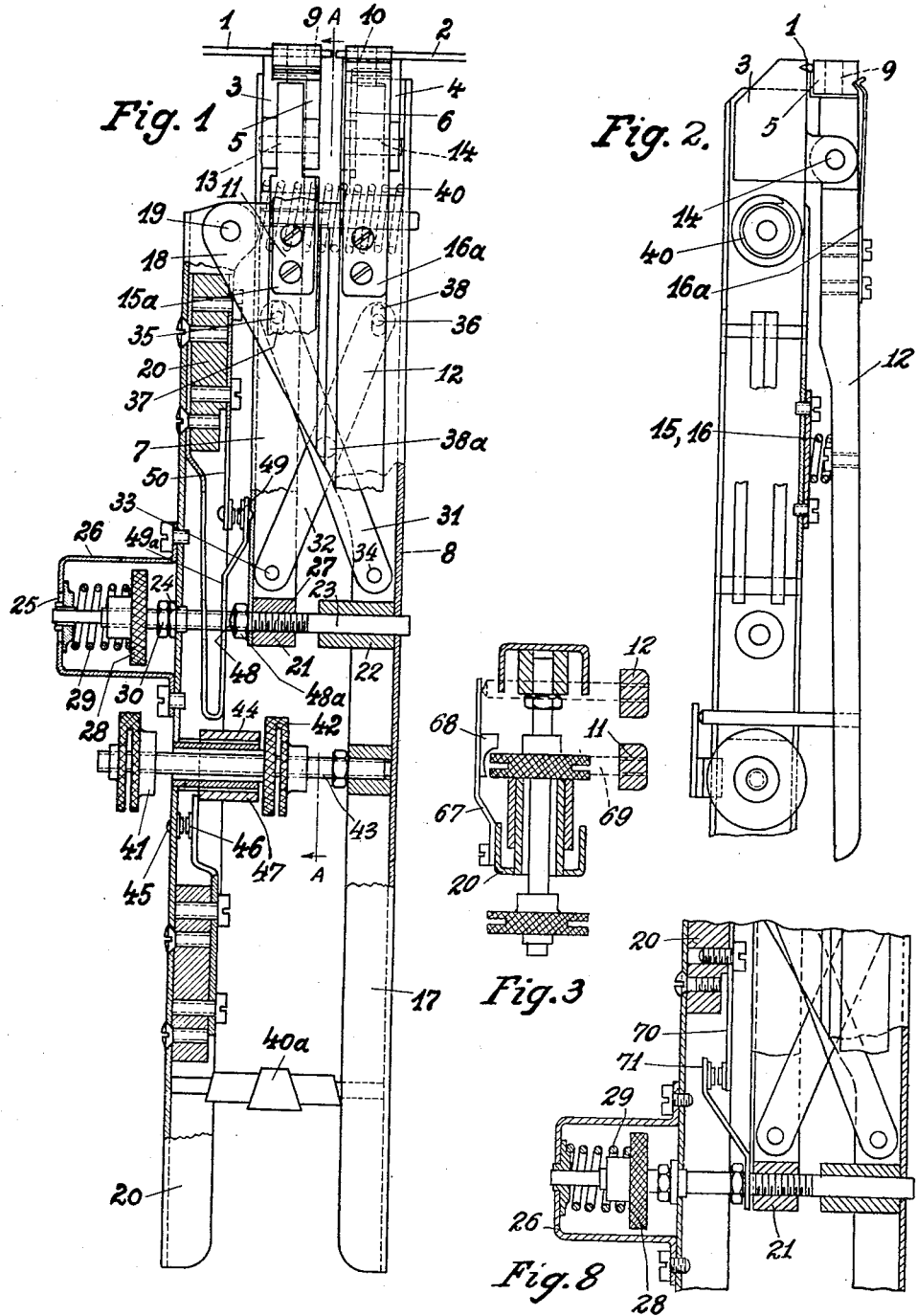

2,213,136

UNITED STATES PATENT OFFICE 2,213,136

ELECTRIC WELDING PLIERS

Walter Jacob Gladitz, Augsburg, Germany, assignor to Keller & Knappich G. m. b. H., Augsburg, Germany, a corporation of Germany Application April 16, 1938, Serial No. 202,538
In Germany April 17, 1937

8 Claims. (Cl. 219—4)

The object of the invention is to provide an implement operable by one hand, through cable connection to a transformer which will enable the union of parts heretofore considered impractical, by butt welding. For example, the wires of electrical cable have hitherto been united with each other by soldering. As the number of wires of cable is extraordinarily large—a cable comprises up to 4000 wires and more—this work is very wasteful of time. Such a union, moreover, involves a very large expenditure of solder and also of copper and insulating material, since with soldering the wires must be twisted together and covered. The invention provides for the union of these wires by butt welding, whereby the disadvantages mentioned with soldering are avoided.

A further object of the invention is to provide a hand operable welding tool which operates completely automatically and in which on the one hand the up-set pressure with which the parts to be welded rest against each other, can be adjusted completely to another definite value and in which on the other hand the switching off of the welding current is effected automatically after exceeding a given up-set distance. In this way it is also possible to unite copper and aluminium wires through butt welding.

The drawing shows an example of the invention in which:

Figure 1 is a longitudinal section,

Figure 2 is a fragmentary central longitudinal section on the line A—A of Figure 1, Figure 3 is a fragmentary section of certain of the parts shown in Figure 1, Figures 4–7 show the different phases of the connection.

Figure 8 shows a fragmentary section on the same plane as Figure 1 but through a modification.

The two wires 1 and 2 which are to be welded are gripped in lower clamping jaws 3 and 4 and upper clamping jaws 5 and 6 so that they extend parallel to each other and the surfaces to be welded together face each other. The two lower clamping jaws 3 and 4 are provided with grooves for holding and directing the wires and are fixed on presser arms 7 and 8 of the pliers. The upper clamping jaws 5 and 6 are interchangeable in order to be able to clamp different sizes and cross sectional shapes and are fitted on the pins 9 and 10 of the double levers 11 and 12 which are pivoted about the pins 13 and 14 which are fixed to the lower clamping jaws 3 and 4. The upper clamping jaws 5 and 6 are pressed against the lower jaws 3 and 4 by springs 15 and 16 so that the wires are held fixed. The upper clamping jaws 5 and 6 are arranged to rotate freely on the pins 9 and 10 so that they always rest on the entire surface of the gripped wire. The springs 15a and 16a are for this purpose of approximately the same width as the upper clamping jaws 5 and 6.

The two clamping jaws 4 and 6 are as already mentioned arranged on the presser arm 8. This presser arm 8 is provided with an extension 18 which is pivotally connected at 19 with a handle 20. The two clamping jaws 3 and 5, are as already mentioned, carried by presser arm 7. On the presser arms 7 and 8 there are fixed the guiding sockets or sleeves 21 and 22, respectively. A pin 23 is slidably disposed in the sleeve 22 and is screwed into the sleeve 21 at 27. The pin 23 is passed through the clearances 24 and 25 of the handle 20 and of the bracket 26 which is secured to the handle 20. A nut 28 is threaded on to the screw 27 and abutting the nut 28 and the inside of the bracket 26 there is a spring 29 which is compressed on pressing together the two handles 17 and 20.

The presser arm 7 is connected with the presser arm 8 by a parallel guide in the form of lazy tongs formed by flat strips or links 31 and 32, which are pivotally connected together at 38a and to the presser arms 7 and 8 by pins 33 and 34 while pins 35 and 36 fixed to the strips 31 and 32 slide in slots 37 and 38 of the presser arms 7 and 8. A spring 40 urges the levers 7 and 8 away from each other, the force being transmitted through the spindle 23, the nut 28, the spring 29 and the bracket 26 to the handle 20. In this way, the play in the joints is rendered harmless. The spring 40 should not be so strong as to affect the accuracy of adjustment of the up-set pressure. A spring 40a serves as the actual opening spring and acts directly on the handles 17 and 20. The clamping opening of the jaws 3 and 4 can be adjusted by means of the nut 41 against which rests the handle 20. The tube 44 which is welded on to the handle 20 does not at first rest on the nut 42 which is screwed on to the spindle 43 secured to the handle 17.

If the handles 17 and 20 are pressed together the force is transmitted in the reverse manner through the bracket 26, the spring 29, the nut 28 and the spindle 23 to the pressure arms 7 and 8. These however, will not approach each other since the two wires 1 and 2 to be welded contact at their end surfaces. The handles may now be pressed together until the tube 44 abuts against the nut 42. The spring 29 is compressed through this movement and the handle 20 is thereby moved away from a stop nut 30 on the spindle 23. The contacts 45 and 46 are closed indirectly by means of the tube 44 through an insulating sleeve 47 which fits freely on the tube 44. Through these contacts a control current circuit is closed. Similarly, the catch 48 secured to a nut resting on the spindle 23 depresses a contact spring 49a so that the contacts 49 and 50 are closed.

The welding current circuit is closed by the closing of the contacts, as will be described hereafter, and the parts 1 and 2 to be welded become soft and white-hot and yield so that the pressure arms 7 and 8 approach each other and the said parts 1 and 2 are up-set. On this account the pressure arm 7 with the nose 48 moves back and the contacts 49, 50 are opened and interruption of the welding current is effected.

The connection of the installation is as illustrated in Figures 4-7. By pressing together the handles 17 and 18 the contacts 49, 50 and 46, 45 are closed the two contacts 45 and 49 being in conducting relation with each other. The contacts 45, 46 close a current circuit 51 which comprises the secondary side 52 of a control transformer, the primary side of which is connected to the network, as well as a coil 53 of a disconnecting contactor and an auxiliary contact 54 which is disconnected on switching in the connecting contactor 55. As the auxiliary contact 54 is still closed the coil 53 of the disconnecting contactor is switched in as shown in Figure 5. In this way the two main contacts 56 and 57 and the two control contacts 58 and 59 of the disconnecting contactor are closed. As the connecting contactor 55 is connected on the one hand to the secondary side of the control transformer 52 and on the other hand to the control contact 58 of the disconnecting contactor 53, on switching in the disconnecting contactor the connecting contactor 55 is at the same time switched in, its main contacts 60 and 61 and the control contact 63 being thereby closed, (Figure 6). In this way the welding transformer 64 is switched in and current is supplied to the separate jaws 3, 4, 5, 6 and also the welding wires 1 and 2 connected to the secondary side of the welding transformer 61. On switching in the connecting contactor 55, the auxiliary contact 54, which is coupled with the connecting contactor, is broken, but the disconnecting contactor 53 remains switched in as it is connected across the control contact 59 and the contacts 46 and 49 to the control transformer 52.

After the welding current has been applied to the wires 1 and 2, the latter soften and are up-set under the pressure of the spring 29 as already described above. The presser arms 7 and 8 and the gripping jaws 3, 5 and 4, 6 approach each other and in this way the abutment 48 moves backwards and the contacts 49 and 50 are separated from each other. In this way the control current circuit 65 is broken and the disconnecting contactor 53 is without current, the main and control contacts 56 to 59 being broken, (Figure 7).

As a result, the welding process is interrupted but the connecting contactor 55 remains closed first of all and therefore the auxiliary contact 54 is opened. The initial condition in which both control current circuits are without current is produced again immediately after the release of the handles 17 and 20. After the release of the handles the presser arms 7 and 8 are pressed away from each other by the springs 40 and 40a and the contacts 45 and 46 are opened. The connecting contactor 55 is then also without current and its main contacts 60, 61 are opened and the secondary contact 54 is closed so that the tool is again ready for welding.

There is the danger that by premature release of the handles 17 and 20 the wires to be welded together will be pulled apart by the springs 40 and 40a before the welding point has become sufficiently solid by cooling. In order to prevent this a spring 67 is provided on the handle 20 and carries a stop catch 68. This stop catch 68, under the pressure of the spring 67 projects over the edge of the nut 42 and in this way prevents the handles 17 and 20 being pulled apart by the springs 40 and 40a. If after the completion of the welding, one of the pair of gripping jaws 3, 5, or 4, 6 is opened by the levers 11 or 12 a spindle 69 fixed on the lever 11 or 12 presses against the spring with the stop or abutment 68 and presses this back against the action of the spring 67. The handles 17 and 20 can then be pressed apart by the springs 40 and 40a.

By the arrangement of a special connecting and disconnecting contactor the welding current is switched off almost instantaneously after the completion of a definite up-set without previously switching in any intermediate relay the magnets of which must first of all be excited. By the arrangement of two contactors it is possible for the second contactor to begin opening the moment the first closes, so that the time during which the current bridge of the primary circuit of the welding current transformer is metallically closed can be brought to zero by suitable adjustment of the control contacts of the two contactors. The disconnection therefore takes place without any loss of time and the welding times can therefore be kept as short as possible. In this connection it should be noted that this arrangement with separate connecting and disconnecting contactors, which gives particularly short switching times is not only of great value for butt welding but also for spot welding and in particular for welding aluminium and its alloys as well as stainless steels.

Figure 8 shows a somewhat modified form of the invention. Whilst in the arrangement according to Figures 1 to 7 the contacts 49 and 50 which switch off the welding current operate with closed circuit current and are opened to switch off the welding current, in the arrangement according to Figure 8 the corresponding contacts 70 and 71 which likewise serve to switch off the welding current operate with working current and are thus closed after a certain up-set path has been covered and accordingly close a control current circuit which effects the disconnection of the main contacts. Accordingly, on the upper part of the handle 20 there is secured a fixed contact bar 70 and a second contact bar 71 is provided on the guiding socket 21 which may be fixed or resilient. On switching in the welding current the two contacts 70 and 71 do not touch each other but if, however, the parts to be welded are up-set on account of the pressure bearing on them and the welding heat and on this account the two handles 17 and 20 come together the two contacts 70 and 71 meet, the control circuit is closed and the welding current is switched off.

A further description of Figure 8 is not necessary as with the exception of the arrangement of the contacts and the formation of the disconnecting current as working current, it corresponds completely with the arrangement according to Figures 1 to 3.

The invention is moreover not limited to the above described examples of construction but can be modified in other ways.

I claim:

1. A hand operable implement for electric butt welding comprising alined gripping devices for holding the parts to be welded in endwise relation, handles carrying said gripping devices and relatively movable manually toward one another to operate the gripping devices to press together the ends of said parts to be welded, a spring interposed between and connecting one of the handles to its respective gripping device and compressible by relative movement of the handles toward one another to apply upsetting pressure to said parts, means for limiting the relative movement of the handles toward one another to thereby predetermine the extent to which said spring is compressed, and welding current controlling contacts engageable by the relative movement of the handles to compress said spring and apply the upset pressure to said parts and disengageable under control of the expansion of said spring during the upsetting of said parts.

2. A hand operable implement for electric butt welding comprising alined gripping devices for holding the parts to be welded in endwise relation, handles carrying said gripping devices and relatively movable manually toward one another to operate the gripping devices to press together the ends of the parts to be welded, a spring interposed between and connecting one of the handles to its respective gripping device and compressible by relative movement of the handles toward one another to apply upsetting pressure to said parts, a controlling current circuit including contacts engageable by relative movement of the handles toward one another to compress said spring, and a welding current circuit controlled by said controlling circuit and including controlling contacts engageable by the relative movement of the handles to compress said spring and apply the upsetting pressure to said parts and disengageable under control of the expansion of said spring during the upsetting of said parts.

3. A hand operable implement for electric butt welding comprising alined gripping devices for holding the parts to be welded in endwise relation, handles carrying said gripping devices and relatively movable manually toward one another to operate the gripping devices to press together the ends of the parts to be welded, a spring interposed between and connecting one of the handles to its respective gripping device and compressible by relative movement of the handles toward one another to apply upsetting pressure to said parts, means or limiting the relative movement of the handles toward one another to thereby predetermine the extent to which said spring is compressed, a controlling current circuit including contacts engageable by relative movement of the handles toward one another to compress said spring to said predetermined extent, and a welding current circuit controlled by said controlling circuit and including controlling contacts engageable by the relative movement of the handles to compress said spring and apply the upsetting pressure to said parts and disengageable under control of the expansion of said spring during the upsetting of said parts.

4. A hand operable implement for electric butt welding comprising alined gripping devices for holding the parts to be welded in endwise relation, handles carrying said gripping devices and relatively movable manually toward one another to operate the gripping devices to press together the ends of the parts to be welded, a spring interposed between and connecting one of the handles to its respective gripping device and compressible by relative movement of the handles toward one another to apply upsetting pressure to said parts, a controlling current circuit including a pair of controlling contacts at least one of which is flexible, said contacts being engageable by relative movement of the handles toward one another to compress said spring, and a welding current circuit controlled by said controlling circuit and including flexible controlling contacts engageable by the relative movement of the handles to compress said spring and apply the upsetting pressure to said parts and disengageable under control of the expansion of said spring during the upsetting of said parts.

5. A hand operable implement for electric butt welding comprising alined gripping devices for holding the parts to be welded in endwise relation, handles carrying said gripping devices and relatively movable manually toward one another to operate the gripping devices to press together the ends of the parts to be welded, a spring interposed between and connecting one of the handles to its respective gripping device and compressible by relative movement of the handles toward one another to apply upsetting pressure to said parts, means for limiting the relative movement of the handles toward one another to thereby predetermine the extent to which said spring is compressed, and welding current controlling contacts engageable by the relative movement of the handles to compress said spring and apply the upsetting pressure to said parts and disengageable under control of the expansion of said spring during the upsetting of said parts, the gripping device to which said spring applies the upsetting pressure being further movable in response to the action of said spring after disengagement of said welding current contacts.

6. A hand operable implement for electric butt welding comprising gripping devices for holding the parts to be welded in endwise relation and for pressing them together so that on heating an upset of said parts takes place, a welding current circuit for said parts, handles carrying said gripping devices movable manually one toward the other, one of said handles supporting the gripping device for one of said parts to be welded, a presser arm supporting the gripping device for the other of said parts to be welded, pressure spring coacting with said presser arm, a guide connecting said presser arm with the other handle so arranged that the parts to be welded are moved toward each other in a parallel direction on pressing the handles together, and contact means in said welding current circuit closable by relative movement of the handles toward one another, said spring being operative to cause opening of the contact means upon occurrence of the upset.

7. A hand operable implement for electric butt welding comprising gripping devices for holding the parts to be welded in endwise relation and for pressing them together endwise so that on heating an upset of the ends of said parts takes place, carriers on which said gripping devices are mounted, said carriers being connected at at least two points for relative movements toward and from one another and having means for guiding them laterally to maintain the gripping devices thereon in alinement, handles operatively connected to and supporting said carriers and relatively movable manually toward one another to operate the gripping devices to press together the parts to be welded, a spring interposed between and connecting one of the handles to one of said carriers and compressible by relative movement of the handles toward one another, a welding current circuit for said parts to be welded, and contact means in said welding current circuit closable by relative movement of the handles toward one another, said spring operating to open the contact means upon occurrence of upset of the parts.

8. A hand operable implement for electric butt welding comprising alined gripping devices for holding the parts to be welded in endwise relation, handles carrying said gripping devices and relatively movable manually toward one another to operate the gripping means to press together the ends of the parts to be welded, a spring interposed between and connecting one of the handles to its respective gripping device and compressible by relative movement of the handles toward one another to apply upsetting pressure to said parts, a controlling current circuit including a connecting contactor and controlling contacts engageable by relative movement of the handles toward one another to compress said spring, and a welding current circuit controlled by said controlling circuit and including a disconnecting contactor and controlling contacts engageable by the relative movement of the handles to compress said spring and apply the upsetting pressure to said parts and disengageable under control of the expansion of said spring during the upsetting of said parts.

WALTER JACOB GLADITZ.